(12) United States Patent
O'Hara et al.

(10) Patent No.: US 12,079,196 B2
(45) Date of Patent: Sep. 3, 2024

(54) FEATURE SELECTION FOR DEVIATION ANALYSIS

(71) Applicant: Business Object Software LTD, Dublin (IE)

(72) Inventors: Paul O'Hara, Dublin (IE); Malte Christian Kaufmann, Dublin (IE); Alan McShane, Dublin (IE)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 182 days.

(21) Appl. No.: 17/497,661

(22) Filed: Oct. 8, 2021

(65) Prior Publication Data

US 2023/0113850 A1    Apr. 13, 2023

(51) Int. Cl.
*G06F 16/23*     (2019.01)
*G06F 16/215*    (2019.01)
*G06F 17/18*     (2006.01)

(52) U.S. Cl.
CPC ........ *G06F 16/2365* (2019.01); *G06F 16/215* (2019.01); *G06F 17/18* (2013.01)

(58) Field of Classification Search
CPC .... G06F 16/2365; G06F 16/215; G06F 17/18; G06F 16/23; G06N 3/00
See application file for complete search history.

(56) References Cited

U.S. PATENT DOCUMENTS

| | | | |
|---|---|---|---|
| 2009/0018996 A1* | 1/2009 | Hunt | G06Q 30/02 |
| 2020/0184367 A1* | 6/2020 | Shivamoggi | G06F 18/2321 |
| 2022/0203784 A1* | 6/2022 | Verheijen | G07C 5/0808 |

* cited by examiner

*Primary Examiner* — Maher N Algibhah
(74) *Attorney, Agent, or Firm* — Fountainhead Law Group, PC (57) ABSTRACT

The present disclosure provides for accurate and efficient identification of candidate features for an input dataset comprising one or more continuous features and one or more categorical features is obtained. A number of categorical feature categories based on the one or more categorical features is determined. Record counts for each of the categorical feature categories are determined. Skew statistics for each category are determined based on the record counts for each of the categorical feature categories. Cardinality skew factors for each of the one or more categorical features are then determined based on the record counts and the skew statistics. A number of the one or more categorical features having the highest cardinality skew factors are selected from among the cardinality skew factors. Then, a top contributor deviation analysis is performed using the selected number of the categorical features having the highest cardinality skew factors.

20 Claims, 7 Drawing Sheets

FEATURE SELECTION FOR DEVIATION ANALYSIS

BACKGROUND

The present disclosure pertains to feature selection, and in particular to feature selection for top contributor deviation analysis.

Today, the volume and complexity of available data collected and stored by organizations is constantly increasing. The size of this data can vary from petabytes to zettabytes or beyond. For many applications the dataset to be processed has grown at a rate that is much faster than can be handled with traditionally available algorithms. Examples of where large datasets can exist include sensor data and transactions.

Sensor data refers to the output from a device that detects and responds to some type of input from an environment. With the rise of the Internet of Things (IoT) and Smart Devices sensor data has grown exponentially with massive volumes of data produced and transmitted from sensing devices. Sensors are utilized to collect data across many distinct fields today, and include healthcare, and manufacturing.

Transactions refer to transaction records. For example, certain industries generate huge quantities of data with analyst responsible for monitoring this data to establish predictions, uncover patterns and devise strategies.

Furthermore, the complexity needed to process big data present challenges for algorithms, these include efficiency and scalability, data quality, velocity, and expertise and experience.

Regarding efficiency and scalability, the efficiency and scalability depend almost entirely on the efficiency of the algorithms and techniques used. As data amounts continue to multiply, these two factors have become critical. If the algorithms and techniques are inefficiently designed, the experience and scalability will be adversely affected, impacting the algorithms adoption within applications Regarding data quality, ensuring the quality of data that an algorithm is applied to is critical. That is, quality decisions are based on quality data.

Regarding velocity, the speed at which data is generated. In live and real-time systems, data is continually arriving into the system, a term often referred to as Data streams. Where data flows into the system, mechanisms are needed to process and extract quality data for passing on to further processing.

Regarding expertise and experience, processing massive datasets requires multiple methods to be applied, facilitating data to be viewed from multiple perspectives, extracting insights and knowledge in the process. Often, a shortage of users exists within organizations with the prerequisite knowledge and expertise required to harness these algorithms in unison with the data to extract these valuable knowledge and insights.

This is where the data mining techniques come to action, helping humans better handle significant data in minimum time. Data mining is a field comprising of both machine learning and statistical techniques and receives wide research. In data mining, novel, interesting, and potentially useful patterns are discovered and extracted from large amounts of data stored in either databases, data warehouses, or other information repositories. Furthermore, data mining allows the analysis of data from multiple perspectives, grouping, categorizing and summarizing identified relationships. Terms often used to describe data mining include knowledge discovery, knowledge extraction, and information harvesting.

Accordingly, there is a need for data mining algorithms that can accurately and efficiently identify quality candidate features for the application of the top contributor deviation algorithm from large datasets.

The present disclosure addresses these issues and others, as further described below.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein. While certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. Furthermore, the terms "first," "second," "third," "fourth," etc., used herein do not necessarily indicate an ordering or sequence unless indicated. These terms may merely be used for differentiation between different objects or elements without specifying an order. The terms "component," "process," "unit," and "module" may refer a hardware circuit or to a set of program code or instructions.

As described above, there is a need for data mining algorithms that can accurately and efficiently identify quality candidate features for the application of the top contributor deviation algorithm from large datasets. To address this need and other issues, the present disclosure provides a framework for automating accurate identification of candidate categorical features for top contributor deviation analysis. As part of this framework, the disclosure introduces a new algorithm for accurate identification of candidate categorical features. The framework facilitates knowledge discovery through reducing the dimensionality of features selected for top contributor deviation analysis, allowing focused analysis.

Mining the top contributor deviation relationship between a continuous feature and all categorical features of a large dataset containing hundreds, thousands or more categorical features, with each categorical feature in turn containing possible hundreds or thousands of categories can be computationally expensive. Therefore, the framework applies an efficient novel algorithm automatically identifying n candidate categorical features where the top contributor deviational relationship between the candidate categorical features and a continuous feature is then mined.

The automated candidate feature identification component focuses on accurate identification of candidate features with the greatest likelihood of producing high ranking deviation scores from the top contributor analysis, ensuring quality categorical feature data is passed to the top contributor deviation analysis algorithm.

Specifically, when one or more continuous feature is selected, the deviational relationship between the identified continuous feature(s) and all categorical features of the dataset can be mined using the proposed framework. A continuous feature denotes numeric data having an infinite number of possible values within a selected range. An example of a continuous feature would be temperature. A categorical feature denotes data containing finite number of possible categories. The data may or may not have a logical order. Examples of a categorical feature include the days of the week, gender, etc.

Furthermore, the candidate feature identification component utilizes categorical features as input, making it structurally independent of the underlying continuous feature the top contributor deviation analysis is be applied against. Thus, the output from the candidate feature identification component can be utilized in the application of the top contributor deviation analysis against multiple continuous features, providing computational efficiency while maintaining accuracy.

In some embodiments, the proposed framework is comprised of a cloud architecture, enabling distributed cloud computing and scalable execution. Regarding distributed cloud computing, through the structural independence between the candidate categorical feature component and the underlying continuous feature(s) of the top contributor deviation analysis component the framework can be distributed across multiple instances. Regarding scalable execution, the framework is appliable to scalable exaction within the Automated Candidate Feature Identification, and Top Contributor Deviation Analysis components. It is achieved through the independence between categorical features and continuous features. As the number of categorical features to be processed by the Automated Candidate Feature Identification component increases, the processing load increases on the system. Through the independence between categorical features and the cloud native architecture, the system can automatically scale up resources available and load-balance processing across resources. This enables the efficient processing of massive amounts of data, scaling to ensure reasonable performance is maintained as the number of categorical features and continuous features increase.

The proposed framework enables the efficient identification of candidates with the greatest likelihood of having the greatest informational relationship, ensuring the quality and accuracy of the output from the top contributor deviation analysis.

Features and advantages of the present disclosure include an algorithm enabling accurate pre-selection of candidate categorical features for further top contributor deviation analysis processing. Experiments demonstrate the identified candidate features consistently represent the highest n ranked categorical features produced from an application of top contributor deviation analysis algorithm where no candidate pre-selection was performed.

Features and advantages of the present disclosure further include a framework utilizing statistics relative to the categories of each categorical feature for automating the selection of high-quality candidate categorical features for passing to the top contributor deviation analysis algorithm.

Features and advantages of the present disclosure further include structural independence of the candidate categorical feature component from the top contributor deviation analysis component provides the ability to efficiently utilize the output candidate categorical features in application of the top contributor deviation analysis for several continuous features.

Features and advantages of the present disclosure further include a framework ensuring reasonable efficiency and performance as the number of categorical features increase through the candidate feature identification component.

Features and advantages of the present disclosure further include consistent performance of the applied top contributor deviation analysis algorithm through utilizing the generated candidate categorical features as input.

Features and advantages of the present disclosure further include a cloud native architecture capable of taking advance of load balancing through the structural independence of the Automated Candidate Feature Identifier and Top Contributor Deviation Analysis components.

Features and advantages of the present disclosure further include a cloud native algorithm and framework capable of efficiently processing massive amounts of data, scaling in a reasonable manner as the number of categorical features and continuous features increase.

Figure 1:
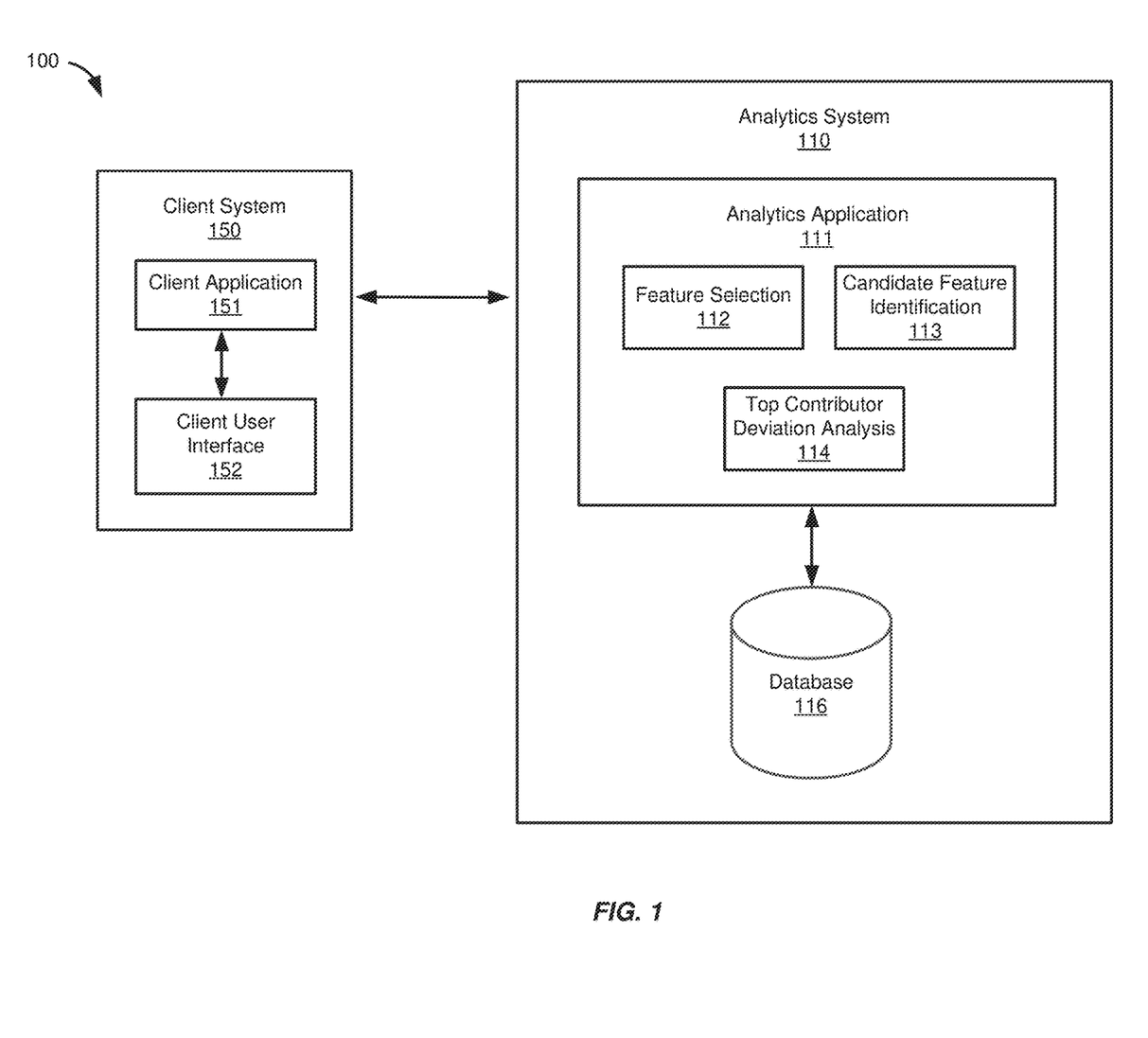
FIG. 1 shows a diagram of an analytics system in communication with a client system, according to an embodiment.

FIG. 1 shows a diagram 100 of an analytics system 110 in communication with a client system 150, according to an embodiment. The analytics system 110 may be configured to perform top contributor deviation analysis and automated feature selection for the top contributor deviation analysis as described herein. The analytics system 110 may comprise one or more server computers including one or more database servers. The analytics system may provide an analytics application 111 for analyzing datasets. The analytics application 111 may be provided using a cloud-based platform or an on-premise platform, for example. The datasets may be stored in a database 116. The analytics application 111 may generate visualizations based on data stored in the database 116.

In some embodiments, the analytics application 111 may generate charts and graphs based on the datasets stored in the database 116. The analytics application 111 may also be capable of performing top contributor deviation analysis on the datasets. In addition, the analytics application 111 may automatically identify quality candidate features for the application of the top contributor deviation analysis.

The analytics application 111 includes a feature selection component 112, a candidate feature identification component 113, and a top contributor deviation analysis component 114. The feature selection component 112 may be configured to identify continuous features and categorical features of a dataset to be applied by the candidate feature identification component 113. The candidate feature identification component 113 may be configured to determine a cardinality-skew factor for each selected categorical feature which may represent the likelihood of the categorical feature achieving a significant score within the top contributor deviation analysis component 114. The top contributor deviation analysis component 114 may be configured to determine a deviation score against each candidate categorical feature where the deviation score indicates the deviational relationship of the candidate categorical feature and the selected continuous feature. Feature selection, candidate feature identification, and top contributor deviation analysis are further described below.

The client system 150 includes a client application 151. The client application 151 may be a software application or a web browser, for example. The client application 151 may be capable of rendering or presenting visualizations on a client user interface 152. The client user interface may include a display device for displaying visualizations and one or more input methods for obtaining input from a user of the client system 150.

The client system 150 may communicate with the analytics system 110 (e.g., over a local network or the Internet). For example, the client application 151 may query or request visualizations based on data stored in the database 116. In some cases, the client system 150 may request the analytics application 111 to perform top contributor deviation analysis. The analytics system 110 may automatically select features and perform the deviation analysis as further described below. The deviation analysis may be provided to the client application 151 and presented in the user interface 152.

Figure 2:
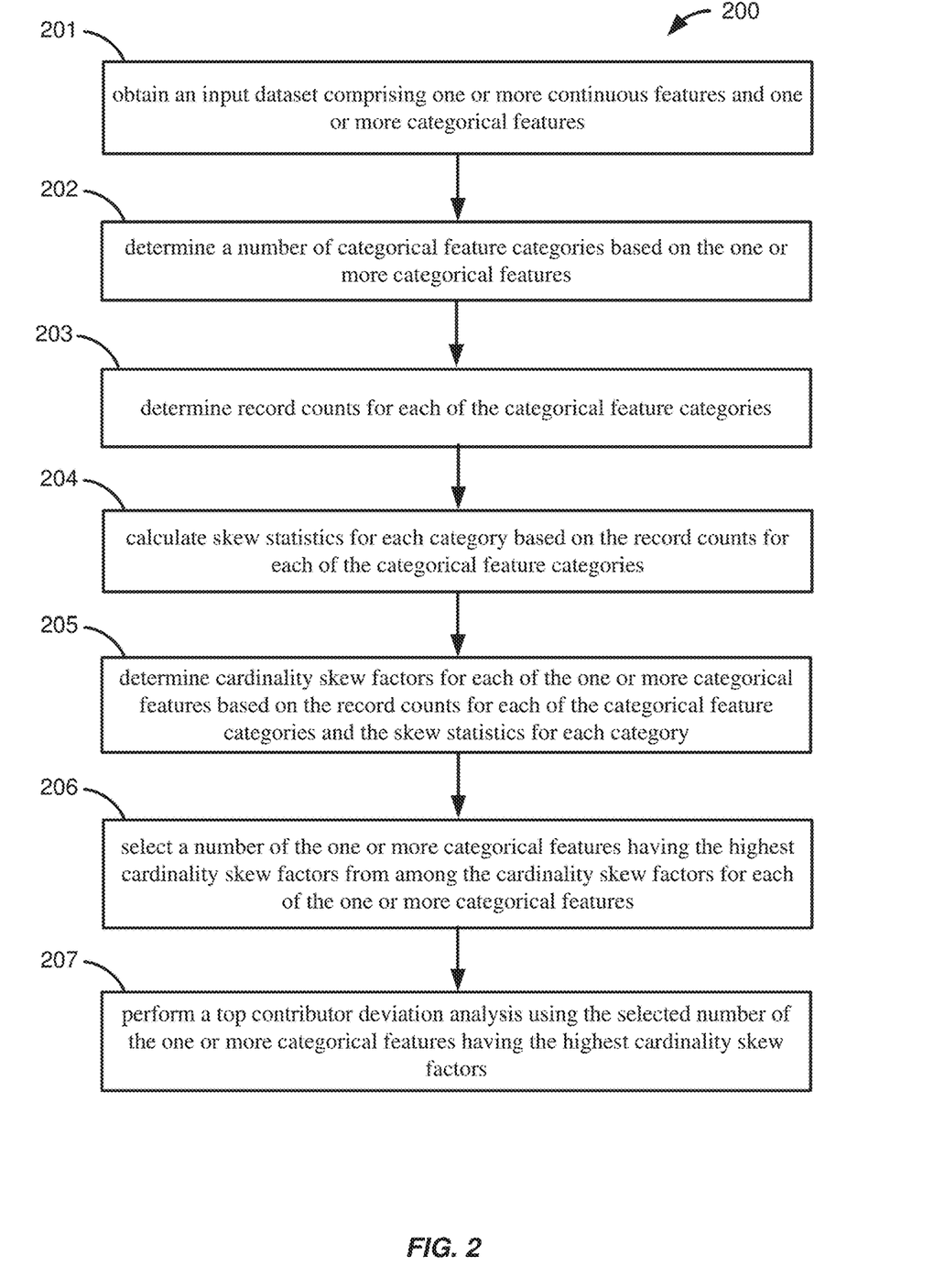
FIG. 2 shows a flowchart of a method for automated feature selection, according to an embodiment.

FIG. 2 shows a flowchart 200 of a method for automated feature selection, according to an embodiment. This method may be performed by a computer system, such as the analytics system 110 described above with respect to FIG. 1.

At 201, the method may obtain an input dataset comprising one or more continuous features and one or more categorical features.

At 202, the method may determine a number of categorical feature categories based on the one or more categorical features.

At 203, the method may determine record counts for each of the categorical feature categories.

At 204, the method may calculate skew statistics for each category based on the record counts for each of the categorical feature categories.

At 205, the method may determine cardinality skew factors for each of the one or more categorical features based on the record counts for each of the categorical feature categories and the skew statistics for each category.

At 206, the method may select a number of the one or more categorical features having the highest cardinality skew factors from among the cardinality skew factors for each of the one or more categorical features.

At 207, the method may perform a top contributor deviation analysis using the selected number of the one or more categorical features having the highest cardinality skew factors.

Figure 3:
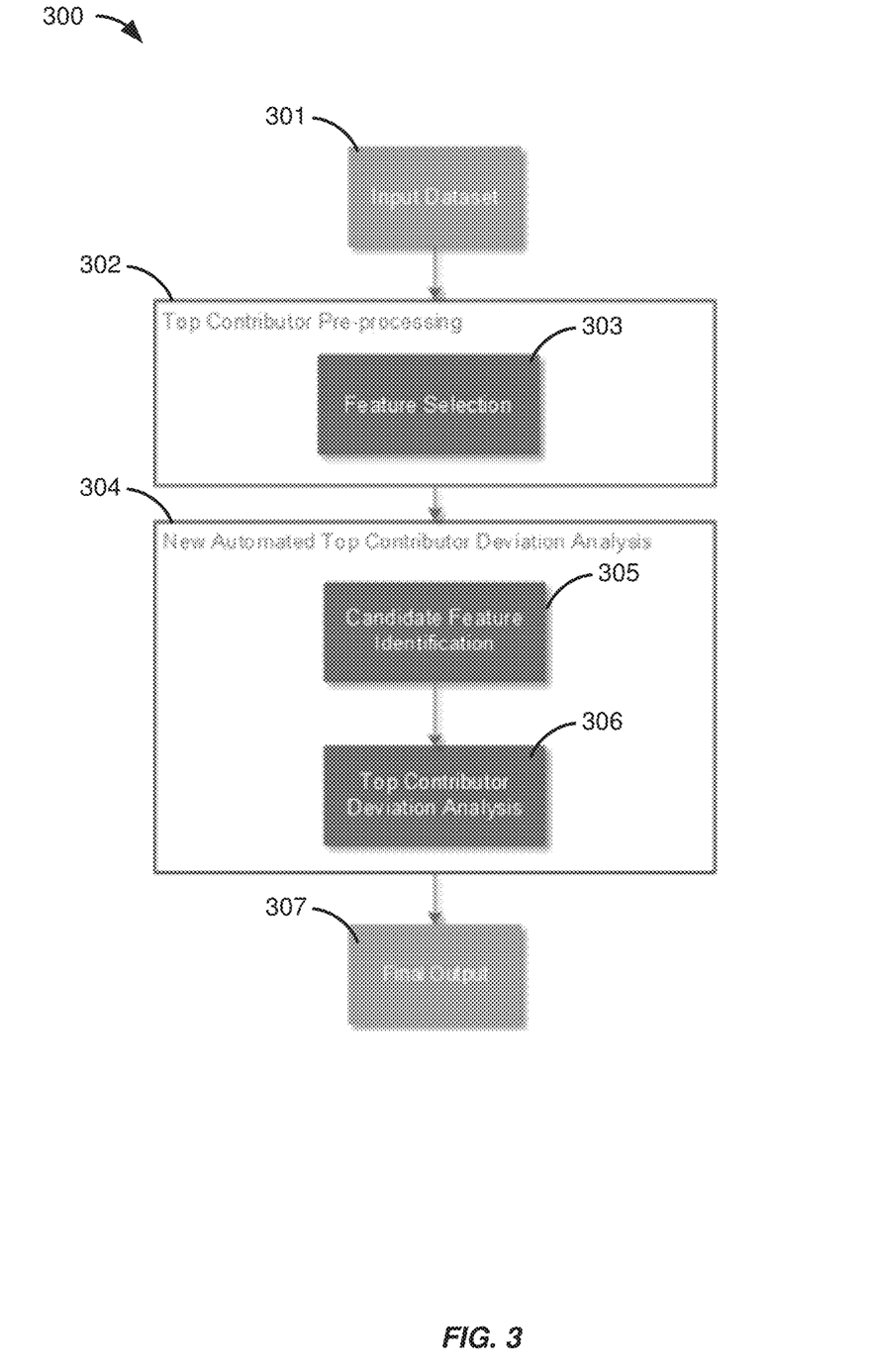
FIG. 3 shows a diagram of a process for automated feature selection for top contributor deviation analysis, according to an embodiment.

FIG. 3 shows a diagram 300 of a process for automated feature selection for top contributor deviation analysis, according to an embodiment. The process uses an input dataset 301 comprising one or more continuous feature and one or more categorical feature. The process consists of two parts, Top Contributor Pre-Processing 302 and New Automated Top Contributor Deviation Analysis 304.

Top Contributor Pre-processing 302 may constrain the input dataset. For instance, a feature selection component 303 may constrain the input dataset, identifying the continuous features and categorical features that the New Automated Feature Selection Top Contributor Analysis 305 is to be applied against. The selected continuous features and categorical features are then passed to the New Automated Top Contributor Deviation Analysis component 304.

New Automated Top Contributor Deviation Analysis 304 comprises two components, Candidate Feature Identification 305 and Top Contributor Deviation Analysis 306. The Candidate Feature Identification component 305 may be applied to the selected categorical features, extracting a cardinality-skew factor for each selected categorical feature representing the likelihood of the categorical feature achieving a significant score within the Top Contributor Deviation Analysis component 306. The top n categorical features with the greatest cardinality-skew factor values may be selected as candidate categorical features and passed to the Top Contributor Deviation Analysis component 306.

The Top Contributor Deviation Analysis component 306 may take as input the selected continuous features and candidate categorical features output from the Candidate Feature Identification component 305. For each selected continuous feature, a Top Contributor algorithm may be applied to generate a deviation score for each candidate categorical feature. The deviation score may indicate the deviational relationship of the candidate categorical feature and the selected continuous feature. The candidate categorical features may then be ordered and ranked based on their deviation scores, with higher deviation scores indicating a greater deviational relationship with the current continuous feature. This ranking of candidate categorical features according to their deviation scores is the output 307 of the process. Feature selection, candidate feature identification, and top contributor deviation analysis are described in further detail below.

Figure 4:
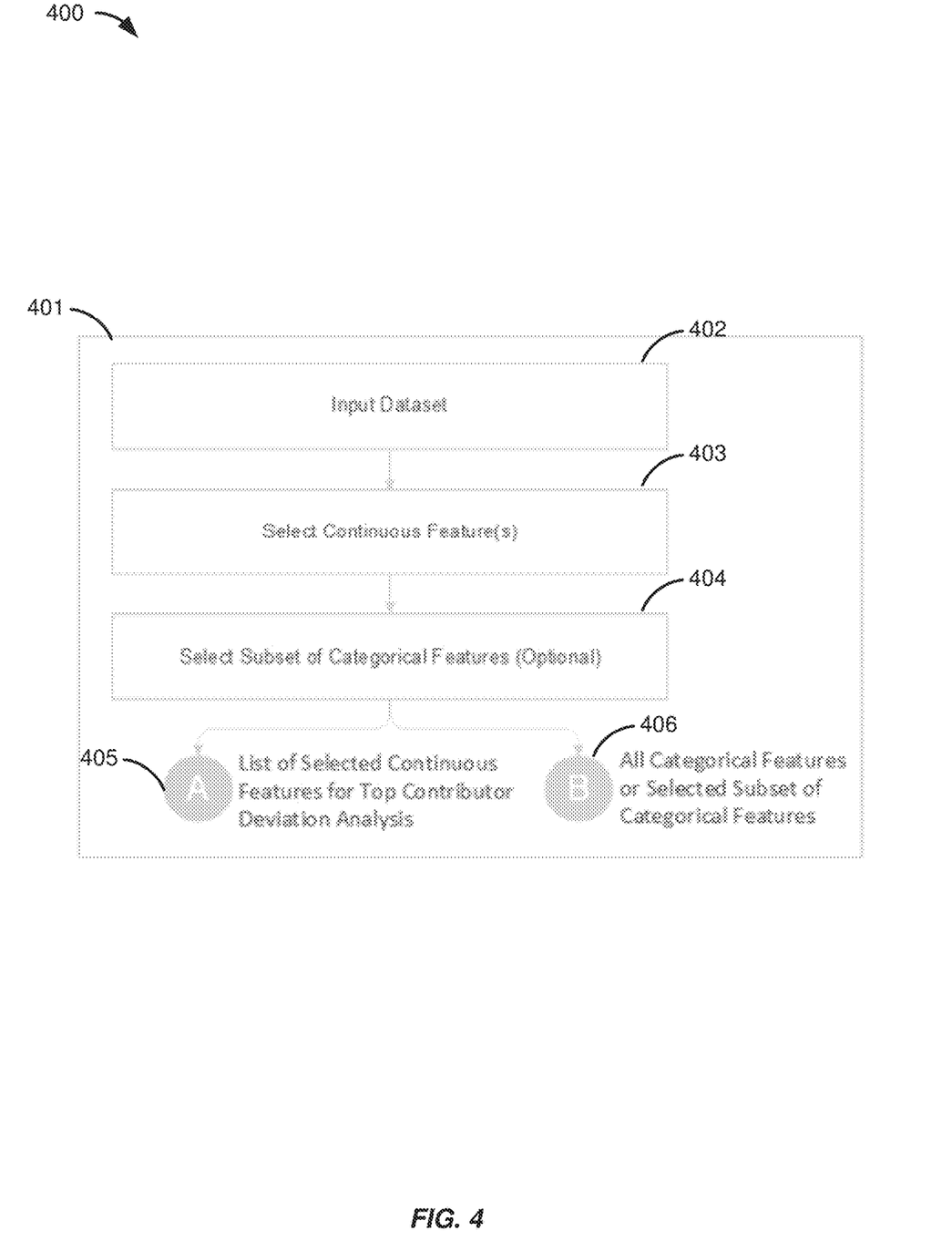
FIG. 4 shows a diagram of a feature selection process, according to an embodiment.

FIG. 4 shows a diagram 400 of a feature selection process 401, according to an embodiment. The feature selection process 401 corresponds to the feature selection component 303 described above with respect to FIG. 3. The feature selection process 401 includes an input dataset 402, a select continuous features component 403, and a select subset of categorical features component 404. Outputs of the feature selection process 401 include a list of selected continuous features for top contributor deviation analysis 405 (labeled "A" in FIG. 4) and a set of all categorical features or a selected subset of categorical features 406 (labeled "B" in FIG. 4).

An input dataset 402 (e.g., the input dataset 301 described above with respect to FIG. 3), may be input to Top Contributor Pre-Processing (e.g., 302 in FIG. 3) for the feature selection process 401. The input dataset 402 may represent a structured form of data presented in tabular form, for example. Within the tabular format, columns may represent the labeled features and rows may hold the values of these features relative to their respective columns. The labeled features may represent continuous or categorical data. Continuous features refers to numeric data having an infinite number of possible values within a selected range. An example of a continuous feature would be temperature. Categorical Feature refers to data containing a finite number of possible categories. The data may or may not have a logical order. Examples of categorical data include days of the week, gender, etc.

The select continuous features component 403 is passed the input dataset 402 and one or more continuous features are selected for New Automated Top Contributor Deviation Analysis.

The select subset of categorical features component 404 is passed the continuous features selected by the select continuous features component 403. From the available categorical features within the dataset a subset of categorical features is optionally selected for New Automated Top Contributor Deviation Analysis. If no subset selection is performed, all categorical features contained within the input dataset are selected for New Automated Top Contributor Deviation Analysis. As output, a constrained dataset comprising of the selected continuous features 405 and categorical features 406 are then passed to the New Automated Top Contributor Deviation Analysis component, which is further described below.

The Automated Top Contributor Deviation Analysis part comprises two components, Candidate Feature Identification and Top Contributor Deviation Analysis. The Candidate Feature Identification component utilizes as input the selected categorical features. For each categorical feature a cardinality-skew factor is generated, which may represent the likelihood of the feature obtaining a significant deviation score relative to the other categorical features if applied to the Top Contributor Deviation algorithm from some selected continuous features within the Top Contributor Deviation Analysis component. The top n categorical features with the greatest cardinality-skew factor are then selected as candidate categorical features for Top Contributor Deviation Analysis.

Top Contributor Deviation Analysis is then applied to each selected continuous feature. For each selected continuous feature, the Top Contributor Deviation algorithm is applied utilizing the current continuous feature and derived candidate categorical features, producing a deviation score for each candidate categorical feature relative to the current continuous feature. The deviation score provides informational insights towards the deviational behavior of each candidate categorical feature relative to the continuous feature. Utilizing the produced deviation score, ranking of the candidate categorical features against each selected continuous feature can be achieved.

Once all continuous features are processed, as output, a map of continuous feature to ranked candidate categorical feature deviation list is produced. The components of the New Automated Top Contributor Deviation Analysis are discussed in more detail below with respect to FIG. 5 and FIG. 6.

Figure 5:
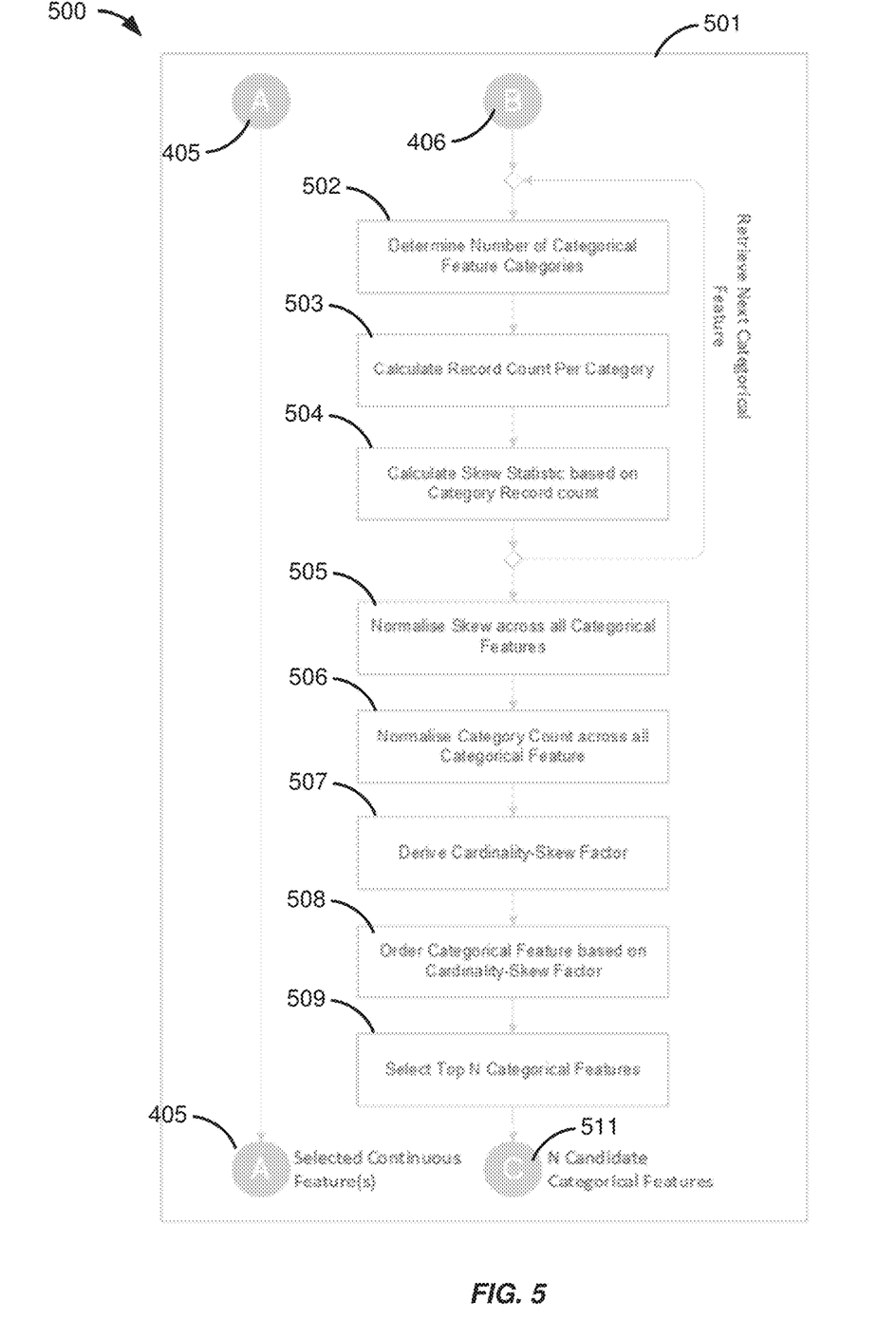
FIG. 5 shows a diagram of a candidate feature identification process, according to an embodiment.

FIG. 5 shows a diagram 500 of a candidate feature identification process 501, according to an embodiment. The candidate feature identification process 501 corresponds to the candidate feature identification component 305 described above with respect to FIG. 3. Inputs to the candidate feature identification process 501 include a set of all categorical features or a selected subset of categorical features 406 (labeled "B" in FIGS. 4 and 5).

The candidate feature identification process 501 includes a process 502 to determine a number of categorical feature categories, a process 503 to calculate record counts per category, a process 504 to calculate skew statistics based on the category record counts, a process 505 to normalize skew across all categorical features, a process 506 to normalize category count across all categorical features, a process 507 to derive cardinality-skew factors, a process 508 to order categorical feature based on the cardinality-skew factor, and a process 509 to select the top n categorical features. These processes 502-509 of the candidate feature identification process 501 are described in further detail below. The output of the candidate feature identification process 501 is N candidate categorical features 511.

The categorical features 406 are used as input to the Candidate Feature Identification process 501. The continuous features 405 may not be used in identifying the candidate categorical features 511. Having only the categorical feature as input, the Candidate Feature Identification component 305 is decoupled from the Top Contributor Deviation Analysis Component 306, with no knowledge of the selected continuous features required to identify quality candidates.

In process 502, for each categorical feature, the number of categories existing for the categorical feature are identified. Then, in process 503, the count of records existing for each category is determined. Subsequently, using of the record count of each category of the categorical feature, the skew statistic is calculated in process 504. The skew statistic may indicate an asymmetry of a distribution of a variable around its mean, where the value can be positive, zero, or negative.

An exemplary cardinality skew algorithm may be defined as follows:

An exemplary cardinality skew algorithm may be defined as follows:

$$\text{cardinalitySkew}(\text{skew}_{normcatfeature}, \text{cardcount}_{normcatfeature}) = \text{skew}_{normcatfeature} - \text{cardcount}_{normcatfeature}$$

$$\text{skew}_{normcatfeature}$$

$$\text{skew}_{normcat\ feature} = \frac{(\text{skew}_{catfeature} - \mu_{skew})}{\sigma_{skew}}$$

Let $\text{skew}_{catfeature}$ be:

$$\text{skew}_{catfeature} = \left( \frac{1}{n} \sum_{categoryrecordcount=0}^{n} \left( \frac{\mu_{categoryrecordcount} - x_{categoryrecordcount}}{\sigma} \right)^3 \right) * \frac{\sqrt{n(n-1)}}{n-2}$$

With:

$$\mu_{categoryrecordcount} =$$

$$\frac{1}{n} \sum_{categoryrecordcount=}^{n} x_{categoryrecordcount} \sigma_{categoryrecordcount} = \sqrt{\frac{\sum_{categoryrecordcount=0}^{n}(x_{categoryrecordcount} - \mu_{categoryrecordcount})^2}{n}}$$

n=total number of categories for a categorical feature $x_{categoryrecordcount}$=the number of records existing for a category of categorical feature X cardcount$_{normcatfeature}$ $$cardcount_{normcatfeature} = \frac{cardcount_{catfeature} - \mu_{cardcount}}{\sigma_{cardcount}}$$

Let cardcount$_{catfeature}$ be:
cardcount$_{catfeature}$=the number of distinct categories category$_i$, ... category$_n$ existing for a categorical feature
With:

$$\mu_{cardcount} = \frac{1}{n}\sum\nolimits_{catfeature=0}^{n} cardcount_{catfeature}$$

$$\sigma_{cardcount} = \sqrt{\frac{\sum\nolimits_{catfeature=0}^{n}(cardcount_{catfeature} - \mu_{cardcount})^2}{n}}$$

n=total number of categorical features

Herein, a positive skew value may indicate that most categories for the categorical feature had a low record count suggesting anomalous categories exist containing a high record count for the categorical feature. A negative skew value may indicate that most categories for the categorical feature have a high record count suggesting anomalous categories exist containing a low record count for the categorical feature. A skew statistic near zero may indicate an asymmetric distribution of records amongst the categories.

When all categorical features are processed, the skew and category count statistics produced for each categorical feature are normalized, in process 505 and 506 respectively, to have mean 0 and variance 1. Through normalization, the values of the statistic change to have a common scale, without distorting differences in the range of values. This enables each variable to contribute equally when deriving the cardinality-skew factor. For example, if the category count statistic ranged between 2,000 and 5,000 and the skew statistic ranged between −5 and +12, without standardization the category count statistic would have a greater influence when deriving the cardinality-skew factor.

Then, utilizing the normalized category count and skew statistics, the cardinality-skew factor for each categorical feature is derived in process 507. The cardinality-skew factor may indicate the distribution of a categorical features categories to records while incorporating the cardinality information of a categorical feature. The greater the cardinality-skew factor for a categorical feature relative to all other categorical features may indicate increased likelihood that the categorical feature will obtain a significant deviation score within the Top Contributor Deviation Analysis component 306. Regarding the cardinality-skew, categorical features with high values suggest a skewed distribution of records between categories towards a category containing an anomalous high number of records relative to all other categories, thereby indicating a greater likelihood to produce a significant deviation score.

Once all categorical features are processed and cardinality-skew factors produced, the categorical features are arranged, in process 508, in descending order based on the cardinality-skew factor and the top n categorical features identified, in process 509, as candidate features for Top Contributor Deviation Analysis. As output 511 the n identified candidate categorical features and the selected continuous features are passed to the Top Contributor Deviation Analysis component 306.

Figure 6:
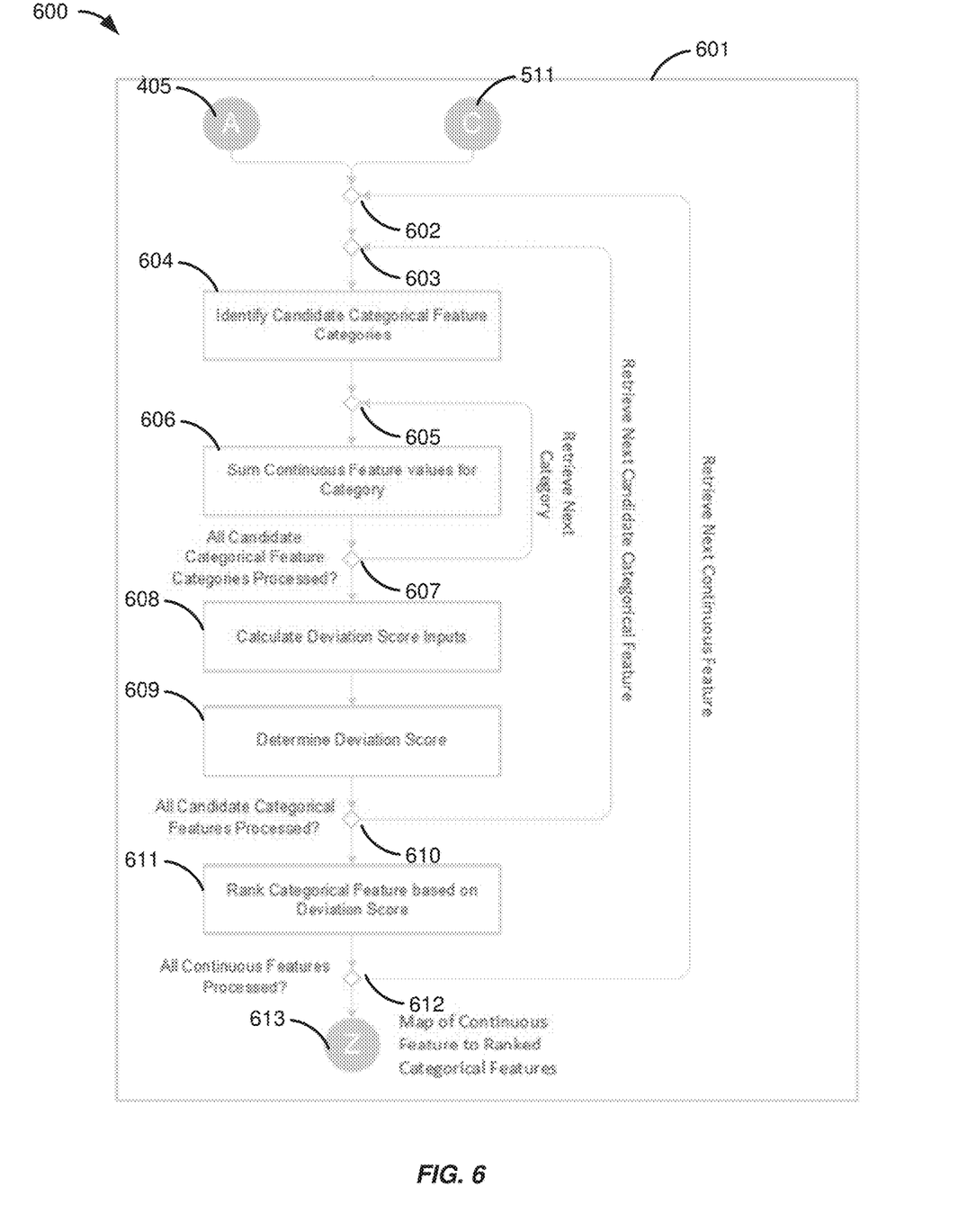
FIG. 6 shows a diagram of a deviation analysis process, according to an embodiment.

FIG. 6 shows a diagram 600 of a deviation analysis process 601, according to an embodiment. The deviation analysis process 601 corresponds to the top contributor deviation analysis 306 described above with respect to FIG. 3. The deviation analysis process 601 receives as input the n identified candidate categorical features 511 and the selected continuous features 405. The deviation analysis process 601 includes process 602 to retrieve the next continuous feature, process 603 to retrieve the next candidate categorical feature, process 604 to identify candidate categorical feature categories, process 605 to retrieve the next category, process 606 to sum the continuous feature values for a category, process 607 to determine whether all candidate categorical feature categories were processed process 608 to calculate deviation score inputs, process 609 to determine deviation scores, process 610 to determine whether all candidate categorical features were processed, process 611 to rank categorical features based on deviation score, and process 612 to determine whether all continuous features were processed. These processes of the deviation analysis process 601 are further described below. An output of the deviation analysis process 601 is a map 613 of continuous features to ranked categorical features.

As shown in FIG. 6, for each continuous feature, the candidate categorical features are iterated over in processes 603-610 and for each candidate categorical feature its categories are identified in process 604. Subsequently, at 605, for each candidate feature category the sum aggregation is applied to the values of the continuous feature that exist in relation to the category.

When all candidate categories are processed as determined at 607, the deviation score is derived for the candidate categorical feature relative to the current continuous feature at 608. An exemplary algorithm to derive the deviation score is:

$$\text{deviation score}_{candidate\ categorical\ feature} =$$

$$\frac{\alpha - \text{mean}_{sum\ candidate\ categorical\ feature\ category}}{\text{mean}_{sum\ candidate\ categorical\ feature\ category}}$$

where:

$$\alpha = \begin{cases} \max\left(\left\{\begin{array}{l}f(x):x = \text{sum candidate categorical feature category } y_i, \ldots \\ \text{sum candidate categorical feature category}_n\end{array}\right\}\right), \\ \quad \text{if mean}_{sum\ candidae\ categorical\ feature\ category} \geq 0 \\ \min\left(\left\{\begin{array}{l}f(x):x = \text{sum candidate categorical feature category } y_i, \ldots \\ \text{sum candidate categorical feature category}_n\end{array}\right\}\right), \\ \quad \text{if mean}_{sum\ candidae\ categorical\ feature\ category} < 0 \end{cases}$$

As shown in FIG. 6, once all candidate categorical features are processed, as determined at 610, the list of candidate categorical feature deviation scores are ordered, at 611, where the greater the score the greater the deviational behavior is determined to exist between categories. The deviation score list of categorical features for the current continuous feature is then added to a map with the continuous feature as reference.

As shown in FIG. 6, once all continuous features are processed, as determined at 612, as output 613, a map of continuous feature to ranked deviation score categorical features is produced, where for each continuous feature the categorical features containing greater deviational behavior between categories relative to the continuous feature are ranked higher.

Accordingly, this automated feature selection for deviation analysis techniques described above solve the Top Contributor Deviation Analysis informational relationship discovery problem described above with the New Automated Feature Selection Top Contributor Deviation Analysis Framework output of ordered categorical features per selected continuous feature matching those produced if no candidate pre-selection processing were applied with high accuracy, but with enhanced performance control.

Figure 7:
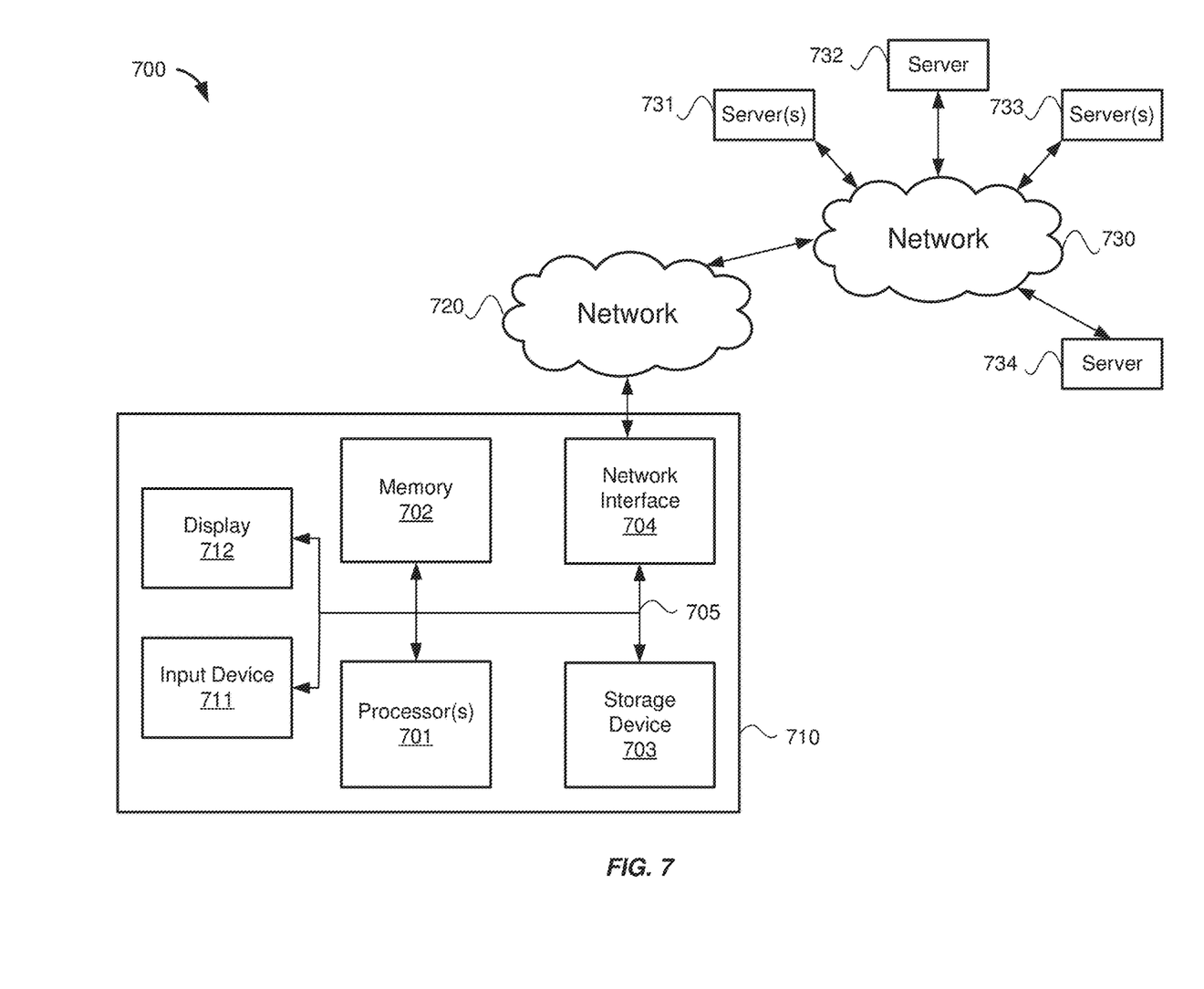
FIG. 7 shows a diagram of hardware of a special purpose computing system for implementing systems and methods described herein.

FIG. 7 shows a diagram 700 of hardware of a special purpose computing system 710 for implementing systems and methods described herein. The computer system 710 includes a bus 705 or other communication mechanism for communicating information, and one or more processors 701 coupled with bus 705 for processing information. The computer system 810 also includes a memory 702 coupled to bus 705 for storing information and instructions to be executed by processor 701, including information and instructions for performing some of the techniques described above, for example. This memory may also be used for storing programs executed by processor(s) 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 703 may include source code, binary code, or software files for performing the techniques above, such as the processes described above, for example. Storage device and memory are both examples of non-transitory computer readable storage mediums.

The computer system 710 may be coupled via bus 705 to a display 712 for displaying information to a computer user. An input device 711 such as a keyboard, touchscreen, and/or mouse is coupled to bus 705 for communicating information and command selections from the user to processor 701. The combination of these components allows the user to communicate with the system. In some systems, bus 705 represents multiple specialized buses, for example.

The computer system also includes a network interface 704 coupled with bus 705. The network interface 704 may provide two-way data communication between computer system 710 and a network 720. The network interface 704 may be a wireless or wired connection, for example. The computer system 710 can send and receive information through the network interface 704 across a local area network, an Intranet, a cellular network, or the Internet, for example. In the Internet example, a browser, for example, may access data and features on backend systems that may reside on multiple different hardware servers 731-734 across the network. The servers 731-734 may be part of a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer system, comprising:
one or more processors; and
one or more non-transitory machine-readable medium coupled to the one or more processors and storing computer program code comprising sets of instructions for executable by the one or more processors to:
obtain an input dataset comprising one or more continuous features and one or more categorical features;
determine a number of categorical feature categories based on the one or more categorical features;
determine record counts for each of the categorical feature categories;
calculate skew statistics for each category based on the record counts for each of the categorical feature categories;
determine cardinality skew factors for each of the one or more categorical features based on the record counts for each of the categorical feature categories and the skew statistics for each category, wherein the cardinality-skew factor indicates the distribution of a categorical features categories;
select a number of the one or more categorical features having the highest cardinality skew factors from among the cardinality skew factors for each of the one or more categorical features; and
distribute a top contributor deviation analysis across multiple cloud computing instances;
perform the top contributor deviation analysis on the multiple cloud computing instances using the selected number of the one or more categorical features having the highest cardinality skew factors.

2. The computer system of claim 1, wherein the one or more categorical features have values that are within a plurality of categories corresponding to the one or more categorical features.

3. The computer system of claim 1, wherein the computer program code further comprises sets of instructions executable by the one or more processors to:
normalize the skew statistic across all the categorical feature categories; and
normalize the record counts for each of the categorical feature categories across all the categorical feature categories.

4. The computer system of claim 1, wherein the computer program code further comprises sets of instructions executable by the one or more processors to:
map continuous features of the one or more continuous features to the number of the one or more categorical features having the highest cardinality skew factors.

5. The computer system of claim 1, wherein the computer program code further comprises sets of instructions executable by the one or more processors to:
order the one or more categorical features based on their corresponding cardinality skew factors.

6. The computer system of claim 1, wherein the top contributor deviation analysis identifies top contributing features to a particular target feature.

7. The computer system of claim 5, wherein performing the top contributor deviation analysis further comprises producing a deviation score for each of the one or more categorical features relative to the one or more continuous features of the input dataset and wherein ordering the one or more categorical features is further based on the deviation score.

8. One or more non-transitory computer-readable medium storing computer program code comprising sets of instructions to:
obtain an input dataset comprising one or more continuous features and one or more categorical features;
determine a number of categorical feature categories based on the one or more categorical features;
determine record counts for each of the categorical feature categories;
calculate skew statistics for each category based on the record counts for each of the categorical feature categories;
determine cardinality skew factors for each of the one or more categorical features based on the record counts for each of the categorical feature categories and the skew statistics for each category, wherein the cardinality-skew factor indicates the distribution of a categorical features categories;
select a number of the one or more categorical features having the highest cardinality skew factors from among the cardinality skew factors for each of the one or more categorical features; and
distribute a top contributor deviation analysis across multiple cloud computing instances;
perform the top contributor deviation analysis on the multiple cloud computing instances using the selected number of the one or more categorical features having the highest cardinality skew factors.

9. The non-transitory computer-readable medium of claim 8, wherein the one or more categorical features have values that are within a plurality of categories corresponding to the one or more categorical features.

10. The non-transitory computer-readable medium of claim 8, wherein the computer program code further comprises sets of instructions to:
normalize the skew statistic across all the categorical feature categories; and
normalize the record counts for each of the categorical feature categories across all the categorical feature categories.

11. The non-transitory computer-readable medium of claim 8, wherein the computer program code further comprises sets of instructions to:
map continuous features of the one or more continuous features to the number of the one or more categorical features having the highest cardinality skew factors.

12. The non-transitory computer-readable medium of claim 8, wherein the computer program code further comprises sets of instructions to:
order the one or more categorical features based on their corresponding cardinality skew factors.

13. The non-transitory computer-readable medium of claim 8, wherein the top contributor deviation analysis identifies top contributing features to a particular target feature.

14. A computer-implemented method, comprising:
obtaining an input dataset comprising one or more continuous features and one or more categorical features;
determining a number of categorical feature categories based on the one or more categorical features;
determining record counts for each of the categorical feature categories;
calculating skew statistics for each category based on the record counts for each of the categorical feature categories;
determining cardinality skew factors for each of the one or more categorical features based on the record counts for each of the categorical feature categories and the skew statistics for each category, wherein the cardinality-skew factor indicates the distribution of a categorical features categories;
selecting a number of the one or more categorical features having the highest cardinality skew factors from among the cardinality skew factors for each of the one or more categorical features; and
distributing a top contributor deviation analysis across multiple cloud computing instances;
performing the top contributor deviation analysis on the multiple cloud computing instances using the selected number of the one or more categorical features having the highest cardinality skew factors.

15. The non-transitory computer-readable medium of claim 12, wherein performing the top contributor deviation analysis further comprises producing a deviation score for each of the one or more categorical features relative to the one or more continuous features of the input dataset and wherein ordering the one or more categorical features is further based on the deviation score.

16. The computer-implemented method of claim 14, wherein the one or more categorical features have values that are within a plurality of categories corresponding to the one or more categorical features.

17. The computer-implemented method of claim 14, further comprising:
normalizing the skew statistic across all the categorical feature categories; and
normalizing the record counts for each of the categorical feature categories across all the categorical feature categories.

18. The computer-implemented method of claim 14, further comprising:
mapping continuous features of the one or more continuous features to the number of the one or more categorical features having the highest cardinality skew factors.

19. The computer-implemented method of claim 14, further comprising:
ordering the one or more categorical features based on their corresponding cardinality skew factors.

20. The computer-implemented method of claim 19, wherein performing the top contributor deviation analysis further comprises producing a deviation score for each of the one or more categorical features relative to the one or more continuous features of the input dataset and wherein ordering the one or more categorical features is further based on the deviation score.

* * * * *